No. 607,245. Patented July 12, 1898.
T. B. JEFFERY.
PNEUMATIC TIRE.
(Application filed Jan. 12, 1894.)
(No Model.)
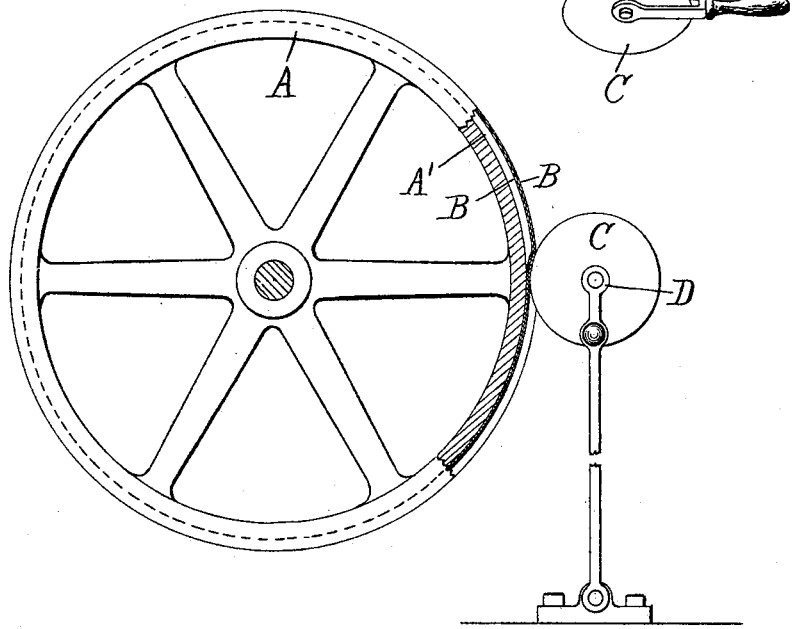
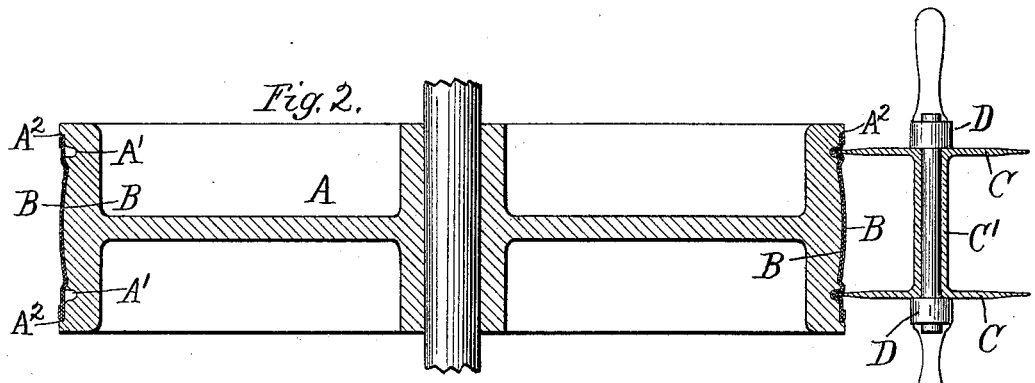
Witnesses.
E. T. Wray.
J. Elliott
Inventor.
Thos. B. Jeffery.

UNITED STATES PATENT OFFICE.

THOMAS B. JEFFERY, OF CHICAGO, ILLINOIS.

PNEUMATIC TIRE.

SPECIFICATION forming part of Letters Patent No. 607,245, dated July 12, 1898.

Application filed January 12, 1894. Serial No. 496,582. (No model.)

*To all whom it may concern:*

Be it known that I, THOMAS B. JEFFERY, a citizen of the United States, residing at Chicago, county of Cook, and State of Illinois, have invented certain new and useful Improvements in Pneumatic Tires and Processes of Making the Same, which are fully set forth in the following specification, reference being had to the accompanying drawings, forming a part thereof.

This invention relates to the making of the covers or sheaths which constitute the outer portions of tires, commonly called "pneumatic," for vehicle-wheels, being adapted to inclose a disengageable rubber core, which, being inflated, fills the sheath and constitutes the air-cushion within it. Such tire sheaths or covers when applied to the wheel-rim and in use on the wheel with the core inflated are substantially circular in cross-section, as if a length of tubing had been wrapped around the periphery of the wheel and its ends joined, although a rift or opening is usually made at the inner circumference, so that the inflatable core may be placed within the sheath before the entire tire thus made is secured on the wheel-rim. The sheath, therefore, being in its condition of use substantially a rifted tube, it has been customary heretofore in making such sheaths to mold them—the material being rubber or rubber-saturated fabric—in substantially the form in which they will appear on the rim. In my improved process I depart from this method by making the sheath in the form of a flat band or short cylinder whose diameter is substantially that of the wheel which it is to fit and whose length or height is the circumference or outer measurement in transverse plane of the tire, and the cylindrical or tubular form which the tire-cover is to assume on the wheel is given to it merely by folding the lateral edges of such cylinder inward to their seats in the wheel-rim. Such tire-covers are in many of their forms arranged to be secured to the rims of the wheels by means of lateral beads or lips projecting from the tire-cover adapted to engage with suitable projecting lips forming recesses to receive the beads of the cover in the rim, and my process in detail is adapted to produce tire-covers of this description. For making such a tire-cover I provide, first, a pulley or wheel of substantially the diameter of the vehicle-wheel for which the tire is designed, and in its face I form grooves corresponding to the size of the tire measuring over the outside from bead to bead. This distance is usually within a small fraction (one-sixth to one-quarter) of the entire circumference of the tire. Upon this wheel I wrap a strap, or as many straps as may be desired, of fabric suitable for the tire-sheath, using, as is customary for such purpose, preferably a fabric which is saturated or charged to a suitable degree with rubber gum, rendering it adhesive, so that it adheres both to itself and to the wheel. This fabric I stretch or depress into the grooves described by the use of a suitable tool, and subsequently apply any covering or filling of rubber or other material which may be desired to give body to the sheath. The forming-wheel may be made of metal, and the tire-cover thus formed upon it may be vulcanized thereon by exposing the wheel containing it to proper temperature, and it may then be removed from the wheel, being readily stretched after vulcanizing enough to relieve it from the grooves mentioned.

In the drawings, Figure 1 is a side elevation of a drum or pulley and coöperating wheel used in my improved process, a portion of the drum being broken out to show the tire-cover in section thereon at a certain point. Fig. 2 is a section through the axes of the drum and coöperating wheel. Fig. 3 is a perspective of a hand-tool which may be used in lieu of the coöperating wheel shown in the other figures. Fig. 4 is a section transversely across the tire-cover, substantially full size, showing a detail modification for insuring permanence in the lugs.

A represents the forming-wheel, mounted on suitable bearings and having the grooves A' A' in its face.

B B represent layers or bands of fabric for the tire-cover applied about the face of the wheel A covering the grooves. One of these bands is wider than the other and has the excess extending on either side folded back over the edges of the first, so that the edges of the tire-cover, when formed, are folded edges and not raw. These bands B B are made of fabric cut bias, so that it is adapted to be stretched down into the grooves in the wheel, as described, without danger of being ruptured in the process, and being, as indicated, saturated with adhesive gum when it is forced or stretched into the grooves, as described, it adheres therein, forming beads or ridges which tend to be permanent. This tendency is furthered by the fact that the two layers of bias fabric in slipping upon each other as they are stretched into the groove and adhering to each other at the positions to which they are stretched prevent each the other from returning if there were any natural tendency to return to the original flat form of the fabric. This tendency to permanency in the ribs or beads thus produced may be made complete and permanency of the beads positively secured by applying another strip or band of adhesive fabric outside the first after the grooves have been filled by depressing the fabric of the first thereinto, as described, this last band securing the fabric of the former bands together across the groove or channel into which the former has been depressed and prevent the fold thus laid from unfolding.

$A^2$ $A^2$ represent shoulders or margins of a channel in the face of the wheel which is the full width of the tire-cover to be formed thereon and which serve as gages at which the wider of the two pieces of fabric will be folded over the edge of the other, which is cut only of the width of the space between these gage-shoulders.

C is a wheel or roller having a dull knife-edged periphery adapting it to force the fabric into the grooves when it is pressed against the outer surface of the fabric as the latter lies over the grooves while the wheel A revolves. The wheel C may be mounted in a handle to be held by the operator while pressing the wheel into the grooves, as in Fig. 3, or there may be two such wheels mounted on a common hub C' or roller provided with two beads, amounting to the same thing, carried in bearings D D, movable with respect to the forming-wheel A, so that both wheels may be simultaneously pressed up against the wheel A as the latter revolves and the fabric stretched into both grooves at once. There is some advantage in thus working upon both grooves at the same time, because thereby the fabric is drawn both ways from the middle at once and is not stretched out of position, as it might be if one line only were operated at a time. The tire-cover thus formed on the wheel may be without the tread-rubber, such tread-rubber being afterward cemented to it; but the device affords a convenient means of completing the tire-cover with the tread secured to it, which may be done by first wrapping the tread-rubber, which has been molded in a strip of proper cross-section, about the wheel A in the space between the two grooves A' A', which corresponds to the space to be occupied by the tread in the completed tire-cover. The fabric will then be applied outside the tread-rubber, as already described, and when the process of shaping on the wheel by stretching the fabric into the grooves is completed and the cover is ready for vulcanizing such vulcanizing process will unite the tread-rubber to the cover in the most perfect manner.

When it is desired to make heavy beads or lips for any purpose, the grooves in the wheel will be shaped accordingly, and any desired filling in the shape of a cord or strip of any material will be wound in the grooves into which the fabric has been depressed, thus further stretching the fabric into the groove if it has not been fully forced thereinto and occupying the space remaining.

If in any case it is desired to make a tire adapted to be turned and used either side out, a filling-strip wider than the depth of the groove or than the depth to which the fabric is forced into the groove will be wound thereinto and will project in a ridge or bead from the face of the wheel and another layer or layers to any desired number of fabric being then wound upon the wheel, another wheel E, having corresponding grooves, being moved up against the first and the two wheels revolved face to face with only the material which has been wound upon the first wheel between them, the last-wound fabric will be stretched over the protruding ribs of the filling and against the foremost fabric bands, to which it will adhere. If the tread-rubber is to be also applied to the cover before vulcanizing, it may be applied at the same time outside of the fabric, and the vulcanizing process being afterward completed the tire-cover will be alike on both sides and have properly-projecting beads adapting it to be used either side out and therefore adapting it to be reversed after being worn upon one side.

I claim—

1. A tire or tire-cover in the form of an endless seamless band as distinguished from a band whose ends are joined after the band is made, or a tubular annulus, such band being composed of fabric embedded in vulcanized rubber, and having beads or flanges parallel to the lateral edges, which, as to the vulcanized rubber are integral with the endless band, and which contain integral tucks of the fabric folded up into the beads or flanges embedded in the integral rubber substance thereof.

2. A tire or tire-cover in the form of an endless band composed of fabric embedded in vulcanized rubber and having beads or flanges parallel to the lateral edges, which as to the vulcanized rubber are integral with the endless band, and which contain integral tucks of the fabric folded up into beads or flanges into the integral rubber substance thereof; in combination with a layer of fabric which is also embedded in the integral rubber substance and extends across the base or back of the tucks.

3. A tire or tire-cover in the form of an endless seamless band as distinguished from one whose ends are joined after the band is made or from a tubular annulus, such band being composed of oppositely-placed layers of bias fabric whose threads are embedded in vulcanized rubber and having beads or flanges parallel to the lateral edges, which, as to vulcanized rubber, are integral with the endless band and which contain integral tucks of the bias fabric folded up into the beads or flanges in the integral rubber substance thereof.

4. A tire or tire-cover in the form of an endless seamless band as distinguished from one whose ends are joined after the band is made, or from a tubular annulus, such band being composed of rubber-saturated bias fabric having beads or flanges parallel to the lateral edges, which beads or flanges as to the rubber are vulcanized and integral with the endless band and which contain integral tucks of fabric constituting the exterior surface of the beads or flanges having its threads embedded with the vulcanized rubber as distinguished from being inclosed bodily in such rubber.

THOS. B. JEFFERY.

Witnesses:
 JEAN ELLIOTT,
 E. T. WRAY.